United States Patent [19]

Kuehnhanss

[11] 3,888,918

[45] June 10, 1975

[54] PROCESS FOR REACTING A SULTONE WITH A NON-BASIC ALKALI METAL, ALKALINE EARTH METAL OR AMMONIUM HALIDE SALT IN AN ANHYDROUS SYSTEM

[75] Inventor: Gerhard O. Kuehnhanss, Baton Rouge, La.

[73] Assignee: Ethyl Corporation, Richmond, Va.

[22] Filed: Dec. 7, 1972

[21] Appl. No.: 312,948

[52] U.S. Cl. ...... 260/513 R; 260/429 K; 260/429.5; 260/429.9; 260/438.1; 260/438.5 R; 260/439 R; 260/448 R

[51] Int. Cl. ........................................... C07c 143/16

[58] Field of Search ................................. 260/513 R

[56] References Cited
UNITED STATES PATENTS

| | | | |
|---|---|---|---|
| 2,210,175 | 8/1940 | Muncie | 260/513 |
| 2,552,421 | 5/1951 | Gilbert et al. | 260/513 |
| 2,974,152 | 3/1961 | Schulze et al. | 260/513 |

FOREIGN PATENTS OR APPLICATIONS 1,093,686  12/1967  United Kingdom........... 260/501.21

OTHER PUBLICATIONS

Hoechst, Chemical Abstract, Vol. 57, pp. 9744 (1962).

Helberger, Ann. 565, pp. 22 (1949).

*Primary Examiner*—Leon Zitver
*Assistant Examiner*—Nicky Chan
*Attorney, Agent, or Firm*—Donald L. Johnson; John F. Sieberth; Shelton B. McAnelly

[57] ABSTRACT

It is disclosed that sultones or alkene sulfonic acids or mixtures thereof are converted to salts of alkene sulfonic acids by reaction in an anhydrous system with a non-basic salt.

18 Claims, No Drawings

PROCESS FOR REACTING A SULTONE WITH A NON-BASIC ALKALI METAL, ALKALINE EARTH METAL OR AMMONIUM HALIDE SALT IN AN ANHYDROUS SYSTEM

FIELD OF THE INVENTION

This invention relates to the preparation of alkene sulfonic acid salts.

BACKGROUND

For the most part, the prior art conversion of sultones or sulfonic acids or of acid-mix product of olefin sulfonation into sulfonic acid salts has been conducted in one or more steps under a wide variety of conditions emphasizing high temperatures and strongly basic conditions because of the difficulty of hydrolysis of sultones and the virtual impossibility of retaining a hydrolyzed "salt" state in acid environment. Some of the prior art involves more or less critically timed complex step sequences with strong reagents. Examples of known operations are given in U.S. Pat. Nos. 2,061,617; 2,187,244; 3,642,881; and 3,496,225.

U.S. Pat. No. 3,496,225 describes an anhydrous conversion process; however, that process requires a base, or basic salts, produces undesirably large amounts of hydroxy sulfonic acid salts and produces a product contaminated by inorganic salt, a state apparently considered desirable to the inventor involved therein but which can be undesirable to others who take deliberate steps to remove inorganic salt (U.S. Pat. Nos. 2,061,617; 3,696,143). The use of a salt in an aqueous conversion to salt of sultones and sulfonic acids is described in co-pending application of Paul Kobetz and Kenneth L. Lindsay, Ser. No. 312,949, filed Dec. 7, 1972, entitled Reactions of Alkyl Sultones with Halide Salts in Aqueous Systems.

Much of the emphasis in connection with the sulfonation of olefins to produce olefin sulfonate salts is centered about the treatment of $SO_3$ sulfonation effluent acid-mix containing about 25–60 percent sultones. When such an "acid-mix" is subjected to basic hydrolysis with aqueous NaOH there is produced the mixtures described in U.S. Pat. No. 3,332,880 as containing about 30–70 percent alkene sulfonic acid salts, about 20–70 percent hydroxy alkyl sulfonic acid salts and about 2–15 percent disulfonate salts. Much of such prior art favors sulfonation procedures using uncomplexed $SO_3$ since these procedures are considered to be conducive to the formation of a high percentage of 3-hydroxy alkane sulfonic acid salts which are usually more desired than 2-hydroxy alkane sulfonic acid salts. The present process avoids the production of significant proportions of 2-hydroxy-alkane sulfonic acid salts.

Olefin sulfonation processes are known to coproduce disulfonates and higher order polysulfonates in appreciable quantities. For example, the compositions of U.S. Pat. No. 3,332,880 are indicated as containing about 2–15 percent disulfonates. Some authorities consider that disulfonates are undesired as detergent components because of their highly polar nature. Usually one can minimize the production of disulfonates to some extent by controlling the mol ratio of $SO_3$ to olefin used in the sulfonation step. Where the $SO_3$:olefin ratio is about 1:1 or less, the amount of disulfonates is generally less than it is with higher $SO_3$:olefin ratios. On the other hand, $SO_3$:olefin ratios of about 1:1 and lower result in the failure of some olefin molecules to be sulfonated. Generally, the prior art accepts about 10 percent disulfonates as a reasonable compromise with "free oil" content (unsulfonated olefins or paraffins) in the sulfonation product.

SUMMARY OF THE INVENTION

In accordance with the present invention a process is provided whereby sultones or alkene sulfonic acids or mixtures thereof or an acid mix obtained by sulfonating an olefin or an olefin mixture with $SO_3$ are converted virtually completely to alkene sulfonic acid salts almost entirely free of contamination by or loss to hydroxy alkane sulfonic acid salts.

Surprisingly, this desired result is attained by performing the aforesaid conversion in an anhydrous state with a mere salt reactant without added strong base or strong acid and at moderate temperatures. The salt used is a non-basic salt, preferably a non-basic halide salt. Preferred salts are inorganic salts, especially inorganic halide salts for reasons set forth hereinafter.

An important aspect of the present invention is the conversion of sultones or alkene sulfonic acids or mixtures thereof or an acid mix obtained by sulfonating an olefin or an olefin mixture with $SO_3$ to alkene sulfonic acid salts by reaction with a non-basic salt to form alkene sulfonic acid salt plus an acid which is volatile at a temperature lower than the sultones, alkene sulfonic acids, acid-mix, and alkene sulfonic acid salts, the volatile acid formed during the reaction being removed during the reaction to facilitate complete conversion to the alkene sulfonic acid salts and to minimize the formation of undesired by-products without requiring a large excess of salt reactant to be fed. Preferably, the process is performed in the presence of an inert diluent that is readily removed when its presence is no longer desired.

Although the present process represents a particularly attractive way to produce highly desired alkene sulfonic acid salts wherein the HX acid formed is recycled, the process is also a convenient source of coproduct anhydrous HX. Particularly is this useful for producing HF, and also HBr, providing a process to produce sulfonic acid salts and HF or HBr from readily available fluoride or bromide salts.

Accordingly, the present invention provides a process for producing an alkene sulfonic acid salt which comprises reacting a sultone or an alkene sulfonic acid or a mixture thereof or an acid mix formed by sulfonating an olefin or an olefin mixture with $SO_3$, said reacting being conducted in an anhydrous system with a non-basic salt whose anion forms a volatile compound when combined with hydrogen and whose cation corresponds to the cation of the sulfonic acid salt being formed, while removing said volatile compound to enhance conversion of the sultone or alkene sulfonic acid or mixture thereof or acid mix to the alkene sulfonic acid salt. Preferred non-basic salts are inorganic salts which are neutral or acidic, particularly salts of HX acids where X is halogen. Preferably, the salt is a halide, especially a chloride or a fluoride or bifluoride. A preferred salt is an ammonium halide, an alkali metal halide or an alkaline earth metal halide. Preferred non-basic salts are ammonium chloride, ammonium fluoride or ammonium bifluoride, an alkali metal chloride, an alkali metal fluoride, an alkali metal bifluoride, an alkaline earth metal chloride and an alkaline earth metal fluoride. Preferred alkali metal halides and alkaline earth metal halides are sodium chloride, sodium fluoride, sodium bifluoride, sodium bromide, potassium chloride, magnesium chloride, and calcium chloride. Where the salt is an alkali metal halide or an alkaline earth metal halide, the salt is preferably employed in approximately a stoichiometric amount relative to the sultone or alkene sulfonic acid or mixture thereof or acid mix used in the reaction.

Ammonium chloride and sodium chloride are highly preferred salts because of their excellent reactivity and properties of their derivatives and because of availability and low cost.

The process preferably is conducted in an inert organic solvent. Hydrocarbon solvents are generally preferred because of their inert nature and solvent properties, low cost and availability.

In a preferred aspect, the process of the invention uses as a non-basic salt ammonium chloride, ammonium fluoride or ammonium bifluoride and the reaction is conducted in an inert hydrocarbon solvent for the alkene sulfonic acid formed.

In a preferred aspect, an acid mix formed by sulfonating an olefin or an olefin mixture with $SO_3$ is employed.

In one aspect, the invention relates to a process for producing an alkene sulfonic acid salt which comprises reacting ammonium chloride, ammonium bromide with a sultone or an alkene sulfonic acid or a mixture thereof or an acid mix formed by sulfonating an olefin or an olefin mixture with $SO_3$, said reaction being conducted in an anhydrous system and in the presence of a hydrocarbon solvent for the alkene sulfonic acid salt, the ammonium chloride or ammonium bromide being present in an excess above the stoichiometric requirement, removing HCl or HBr formed as a byproduct in the reaction, separating from the solution of solvent and alkene sulfonic acid salt the excess ammonium chloride or ammonium bromide remaining after the reaction, and separating the solvent from product alkene sulfonic acid salt. A preferred salt used in this aspect of the invention is ammonium chloride.

In another preferred aspect, the invention relates to a process for producing an alkene sulfonic acid salt and HF which comprises reacting ammonium fluoride or ammonium bifluoride with a sultone or an alkene sulfonic acid or a mixture thereof or an acid mix formed by sulfonating an olefin or an olefin mixture with $SO_3$, said reaction being conducted in an anhydrous system and in the presence of a hydrocarbon solvent for the alkene sulfonic acid salt, the ammonium fluoride or ammonium bifluoride being present in an excess above the stoichiometric requirement, recovering HF formed as a byproduct in the reaction, separating from the solution of solvent and alkene sulfonic acid salt the excess ammonium fluoride or ammonium bifluoride remaining after the reaction, and separating the solvent from product alkene sulfonic acid salt.

One may obtain more or less pure sultones or sulfonic acids in numerous ways. For example, several processes for producing sultones are set forth in U.S. Pat. Nos. 3,117,133; 3,146,242; 3,164,608; 3,164,609; 3,205,237; 3,524,864; 3,579,537 and in Canadian Patent 894,830. In addition, numerous processes are described in U.S. Pat. No. 3,332,880 and the references cited therein, which, like other reference material cited herein, are herewith incorporated herein by reference. A preferred source of starting materials for the present conversion reaction is an acid mix obtained from the sulfonation of an olefin or an olefin mixture as described in various U.S. Patents such as Nos. 2,094,451; 2,187,244; 3,332,880 and 3,376,336, said acid mix preferably being taken prior to hydrolysis. Such an acid mix contains sultones and alkene sulfonic acids as major components along with various other components such as disulfonic acids, unreacted olefins, etc. Sulfonic acids of various forms present in starting materials are readily converted to their salts by the present salt system reaction concurrently with the conversion of sultones or in the absence of sultones to produce sulfonic acid salt as the principal salt product. In this way alkene sulfonic acids are converted to alkene sulfonic acid salts, hydroxy alkane sulfonic acids are converted to hydroxy alkane sulfonic acid salts, alkyl aryl sulfonic acids are converted to alkyl aryl sulfonic acid salts, alkane sulfonic acids are converted to alkane sulfonic acid salts, etc.

Preferred sultones or sulfonic acids or acid mixes useful in the process of the present invention have open or closed or partially closed, preferably open, carbon chain units of from about 6 to about 36 carbon atoms, preferably carbon chain units of from about 10 to about 20 carbon atoms, especially carbon chain units of from about 12 to about 18 carbon atoms. The process is workable with systems which are pure in the sense that all molecules present have the same number of carbon atoms per chain as well as in mixtures containing different carbon chain units. Particularly useful mixtures contain molecules whose uninterrupted carbon chain units contain predominantly the following numbers of carbon atoms: 12 and 14; 12, 14 and 16; 14 and 16; 14, 16 and 18; 16 and 18; 16, 18 and 20; 11, 12, 13, 14 and 15; 12, 13 and 14; 11, 13 and 15; 15, 16, 17 and 18; 15, 17 and 19 and 17, 19 and 21, and the like. These different compositions result in the production of sulfonate salts having desired properties in various water hardnesses, at different temperatures and for cleaning various materials.

The carbon skeleton structures or preferred sultones or sulfonic acids or mixtures or of the components of acid-mixes are saturated or unsaturated, and are straight chain or branched chain, cyclic or aromatic or combinations pure and in mixtures including alkyl aryl sulfonic acids, alkane mono sulfonic acids, alkene mono sulfonic acids, hydroxy alkyl mono sulfonic acids, as well as various disulfonic acids, hydroxy disulfonic acids and the like. Thus mixtures of sultones or sulfonic acids converted to sulfonic acid salts can contain entirely straight or branched or cyclic carbon chain units or other structures or combinations in various proportions. In general, preferred mixtures of alkane or alkene sulfonic acids contain from about 50 to about 100 percent of molecules having straight chain carbon skeleton.

The position of $SO_3$ linkage to the carbon skeleton chains in starting sulfonic acids can be at a terminal carbon atom of the chains or at an internal carbon atom. The positions of $SO_3$ linkage to the carbon chain in starting sultones or polysulfonated molecules can be at various combinations of terminal and internal carbon atoms or at internal carbon atoms. Usual mixtures contain various isomers.

A typical acid mix of sultone and sulfonic acid is obtained by sulfonating a mixture of olefins with uncomplexed $SO_3$ in a mol ratio of $SO_3$ to olefin of from about 0.5:1 to about 2:1, said olefins containing 0 to 100 percent vinyl, 0 to 100 percent vinylidene and 0 to 100 percent internal olefins and having from about 6 to about 24 carbon atoms per molecule. Such an acid-mix may be taken from the sulfonation operation and reacted in the present process preferably without intervening treatment with acids or bases. Of course, where desired, various components of such an acid-mix may be selected or rejected using various processes such as solvent extraction and the like.

A mixture of sultones or sulfonic acids or an acid mix containing a mixture in regard to one or more of (1) numbers of carbon atoms per molecule, (2) carbon skeleton structures and (3) position of $SO_3$ linkages to the carbon skeleton structure is generally preferred because such can be readily produced in one operation by sulfonating a mixture of olefins as available in large quantities and at low cost. Preferably such olefin mixtures are selected to produce product sulfonic acid salt having desired properties either per se or when used in combination with various other sulfonate materials generally used in detergent and other surface active formulations.

Since the present process provides a way to avoid virtually all of the less desired hydroxy sulfonic acid salt components in the final product obtained from a procedure that uses olefin sulfonation with $SO_3$ as a fundamental operation, the present process provides a way to produce materials having excellent surface active properties when using sulfonation processes other than the gaseous uncomplexed $SO_3$ sulfonation processes. Thus complexed $SO_3$ sulfonation processes such as the dioxane complex processes described, for example, in U.S. Pat. No. 2,135,358 may be used to produce starting materials for the present process.

In the present process, the solvent capabilities permit convenient separation and recycle of unsulfonated materials, particularly with an ammonium salt conversion system. Thus, one may find it desirable and practical when using the present process to use a sulfonation with an $SO_3$:olefin ratio somewhat lower than 1:1 such as 0.9:1 to 0.99:1, or even a lower ratio to reduce the amount of disulfonates produced.

Typical sultones processed in accordance with the present invention include: 3-hydroxydecane-1-sulfonic acid sultone, 4-hydroxydecane-1-sulfonic acid sultone, 3-hydroxyundecane-1-sulfonic acid sultone, 4-hydroxyundecane-1-sulfonic acid sultone, 3-hydroxydodecane-1-sulfonic acid sultone, 4-hydroxydodecane-1-sulfonic acid sultone, 3-hydroxytridecane-1-sulfonic acid sultone, 4-hydroxytridecane-1-sulfonic acid sultone, 3-hydroxytetradecane-1-sulfonic acid sultone, 4-hydroxytetradecane-1-sulfonic acid sultone, 3-hydroxypentadecane-1-sulfonic acid sultone, 4-hydroxypentadecane-1-sulfonic acid sultone, 3-hydroxyhexadecane-1-sulfonic acid sultone, 4-hydroxyhexadecane-1-sulfonic acid sultone, 3-hydroxyheptadecane-1-sulfonic acid sultone, 4-hydroxyheptadecane-1-sulfonic acid sultone, 3-hydroxyoctadecane-1-sulfonic acid sultone, 4-hydroxyoctadecane-1-sulfonic acid sultone, 3-hydroxynonadecane-1-sulfonic acid sultone, 4-hydroxynonadecane-1-sulfonic acid, 3-hydroxyeicosane-1-sulfonic acid sultone, 4-hydroxyeicosane-1-sulfonic acid sultone, 3-hydroxyheneicosane-1-sulfonic acid sultone, 4-hydroxyheneicosane-1-sulfonic acid sultone, 3-hydroxydocosane-1-sulfonic acid sultone, 4-hydroxydocosane-1-sulfonic acid sultone, 3-hydroxytricosane-1-sulfonic acid sultone, 4-hydroxytricosane-1-sulfonic acid sultone, 3-hydroxytetracosane-1-sulfonic acid sultone.

Typical alkene sulfonic acids processed in accordance with the present invention include: 1-decene-1-sulfonic acid, 2-decene-1-sulfonic acid, 3-decene-1-sulfonic acid, 4-decene-1-sulfonic acid, 1-undecene-1-sulfonic acid, 2-undecene-1-sulfonic acid, 3-undecene-1-sulfonic acid, 4-undecene-1-sulfonic acid, 1-dodecene-1-sulfonic acid, 2-dodecene-1-sulfonic acid, 3-dodecene-1-sulfonic acid, 4-dodecene-1-sulfonic acid, 1-tridecene-1-sulfonic acid, 2-tridecene-1-sulfonic acid, 3-tridecene-1-sulfonic acid, 4-tridecene-1-sulfonic acid, 1-tetradecene-1-sulfonic acid, 2-tetradecene-1-sulfonic acid, 3-tetradecene-1-sulfonic acid, 4-tetradecene-1-sulfonic acid, 1-pentadecene-1-sulfonic acid, 2-pentadecene-1-sulfonic acid, 3-pentadecene-1-sulfonic acid, 4-pentadecene-1-sulfonic acid, 1-hexadecene-1-sulfonic acid, 2-hexadecene-1-sulfonic acid, 3-hexadecene-1-sulfonic acid, 4-hexadecene-1-sulfonic acid, 1-heptadecene-1-sulfonic acid, 2-heptadecene-1-sulfonic acid, 3-heptadecene-1-sulfonic acid, 4-heptadecene-1-sulfonic acid, 1-octadecene-1-sulfonic acid, 2-octadecene-1-sulfonic acid, 3-octadecene-1-sulfonic acid, 4-octadecene-1-sulfonic acid, 1-nonadecene-1-sulfonic acid, 2-nonadecene-1-sulfonic acid, 3-nonadecene-1-sulfonic acid, 4-nonadecene-1-sulfonic acid, 1-eicosene-1-sulfonic acid, 2-eicosene-1-sulfonic acid, 3-eicosene-1-sulfonic acid, 4-eicosene-1-sulfonic acid, 1-heneicosene-1-sulfonic acid, 2-heneicosene-1-sulfonic acid, 3-heneicosene-1-sulfonic acid, 4-heneicosene-1-sulfonic acid, 1-docosene-1-sulfonic acid, 2-docosene-1-sulfonic acid, 3-docosene-1-sulfonic acid, 4-docosene-1-sulfonic acid, 1-tricosene-1-sulfonic acid, 2-tricosene-1-sulfonic acid, 3-tricosene-1-sulfonic acid, 4-tricosene-1-sulfonic acid, 1-tetracosene-1-sulfonic acid, 2-tetracosene-1-sulfonic acid, 3-tetracosene-1-sulfonic acid, and 4-tetracosene-1-sulfonic acid.

Typical hydroxy alkane sulfonic acids convertible to salts in accordance with the present invention include 3-hydroxy-decane-1-sulfonic acid, 4-hydroxy-decane-1-sulfonic acid, 5-hydroxy-decane-1-sulfonic acid, 3-hydroxy-undecane-1-sulfonic acid, 4-hydroxy-undecane-1-sulfonic acid, 5-hydroxyundecane-1-sulfonic acid, 3-hydroxy-dodecane-1-sulfonic acid, 4-hydroxy-dodecane-1-sulfonic acid, 5-hydroxy-dodecane-1-sulfonic acid, 3-hydroxy-tridecane-1-sulfonic acid, 4-hydroxytridecane-1-sulfonic acid, 5-hydroxy-tridecane-1-sulfonic acid, 3-hydroxy-tetradecane-1-sulfonic acid, 4-hydroxy-tetradecane-1-sulfonic acid, 5-hydroxy-tetradecane-1-sulfonic acid, 3-hydroxy-pentadecane-1-sulfonic acid, 4-hydroxy-pentadecane-1-sulfonic acid, 5-hydroxy-pentadecane-1-sulfonic acid, 3-hydroxyhexadecane-1-sulfonic acid, 4-hydroxy-hexadecane-1-sulfonic acid, 5-hydroxy-hexadecane-1-sulfonic acid, 3-hydroxy-heptadecane-1-sulfonic acid, 4-hydroxy-heptadecane-1-sulfonic acid, 5-hydroxyheptadecane-1-sulfonic acid, 3-hydroxy-nonadecane-1-sulfonic acid, 4-hydroxy-nonadecane-1-sulfonic acid, 5-hydroxy-nonadecane-1- sulfonic acid, 3-hydroxy-eicosane-1-sulfonic acid, 4-hydroxyeicosane-1-sulfonic acid, 5-hydroxy-eicosane-1-sulfonic acid, 3-hydroxy-heneicosane-1-sulfonic acid, 4-hydroxy-heneicosane-1-sulfonic acid, 5-hydroxy-heneicosane-1-sulfonic acid, 3-hydroxydocosane-1-sulfonic acid, 4-hydroxy-docosane-1-sulfonic acid, 5-hydroxy-docosane-1-sulfonic acid, 3-hydroxy-tricosane-1-sulfonic acid, 4-hydroxy-tricosane-1-sulfonic acid, 5-hydroxytricosane-1-sulfonic acid, 3-hydroxy-tetracosane-1-sulfonic acid, 4-hydroxy-tetracosane-1-sulfonic acid, and 5-hydroxytetracosane-1-sulfonic acid.

Typical disulfonic acids and other sulfonic acids convertible to salts in accordance with the teachings of the present invention include: 1-decene-1,2-disulfonic acid, 2-dodecene-1,2-disulfonic acid, 2-tetradecene-1,3-disulfonic acid, 5-pentadecene-1,3-disulfonic acid, 3-hydroxy-3-decene-1,2-disulfonic acid, 3-hydroxy-decane-1,5-disulfonic acid, decane-1-sulfonic acid, undecane-1-sulfonic acid, dodecane-1-sulfonic acid, tridecane-1-sulfonic acid, tetradecane-1-sulfonic acid, pentadecane-1-sulfonic acid, hexadecane-1-sulfonic acid, heptadecane-1-sulfonic acid, octadecane-1-sulfonic acid, nonadecane-1-sulfonic acid, eicosane-1-sulfonic acid, tetradecane-2-sulfonic acid, hexadecane-3-sulfonic acid, 2-ethyl-hexadecane-1-sulfonic acid, 2-methyldodecane-1-sulfonic acid. Other sulfonic acids useful are alkyl benzene sulfonic acids having an alkyl chain containing 10 to 18 carbon atoms.

Some of the foregoing and additional sultones and sulfonic acids and other materials useful in accordance with the teachings of the present invention are described in terms of a starting material produced by sulfonation of various individual olefins or olefin mixtures exemplified by the following: decene-1, undecene-1, dodecene-1, tridecene-1, tetradecene-1, pentadecene-1, hexadecene-1, heptadecene-1, octadecene-1, nonadecene-1, eicosene-1, tricontene-1, 2-ethyl-hexene-1, 2-methyl undecene-1, 2-ethyl decene-1, 2-propyl undecene-1, 2-butyl decene-1, 2-pentyl decene-1, 2-hexyl octene-1, decene-2, undecene-3, dodecene-4, tridecene-2, tetracecene-5, pentadecene-7, hexadecene-6, heptadecene-8, octadecene-2, nonadecene-2, eicosene-2, triconsene-2, 3-ethyl-dodecene-2. Sultone derivatives of the foregoing olefins are generally of the form 1,2-; 1,3-; 1,4-; 1,5-; 2,3-; 2,4-; 2,5-; 2,6- or the like depending upon the procedures used in sulfonation and on the starting olefin. Alkene sulfonic acids, hydroxy alkyl sulfonic acids and disulfonic acids are isomeric in nature depending to some extend upon the predominant form of the co-present or precursor sultones.

The present process is useful for the conversion of various sulfonic acids into salts while using only a salt reactant and without requiring the use of bases. Sulfonic acid salts with selected metal cations are produced directly in the conversion reaction or alternately are produced indirectly via a preliminary conversion reaction with an ammonium salt to produce an ammonium sulfonic acid salt intermediate subsequently reacted in an exchange reaction with an appropriate base to produce salts having the selected metal cations. For example, an ammonium alkene sulfonate produced in accordance with the present process may be reacted with NaOH to produce the sodium alkenesulfonate and ammonia; the ammonia may then be removed by boiling or other means and used to produce ammonium halide for recycle to the salt reaction.

The temperature of the present conversion reaction, although important, is not particularly critical and can be influenced to a degree by pressure. The continuous volatilization removal of the byproduct acid, such as HX, is desired as well as the avoidance of vaporizing loss of the other reactants or product. In some instances, operation at reflux of water or the use of stripping agents is preferred to facilitate the expulsion of liberated acid. As far as the fundamental conversion reaction is concerned, temperatures of from about 50° to about 250°C are useful with temperatures of from about 120° to about 200°C being preferred because of equipment cost and other considerations. Similarly, pressure is not critical with various pressures of from about 0.1 to about 100 atmospheres being suitable. In general, it is preferred to operate at atmospheric pressure or at from about one-half to about 10 atmospheres pressure to avoid costly pressure or vacuum equipment.

Where a subsequent exchange reaction with a base is used to produce sulfonic acid salts having a different cation from that provided for the conversion reaction, similar temperature and pressure considerations apply, permissible temperatures extending downward to about 0°C with temperatures of from about 20° to about 80°C being preferred.

Preferred salts used in the present process are halides, especially halides having ammonium, alkali metal or alkaline earth metal cations.

In one preferred and exemplary aspect, the inorganic salt is ammonium chloride. The use of ammonium chloride or ammonium bromide as well as ammonium fluoride or ammonium bifluoride is preferred in many instances not only because these salts produce volatile HCl or HBr or HF which is recovered from the reaction system readily but also because they produce ammonium alkene sulfonic acid salt which is moderately soluble in convenient organic solvents so as to permit the separation from the alkene sulfonic acid salt product of excess salt reactant which is insoluble in such solvents. The solution of ammonium alkenesulfonate thus freed of excess ammonium halide may then be cooled to crystallize the ammonium alkene sulfonate salt product, which can be recovered by filtration and drying in an essentially pure state, any unreacted olefin or other non-sulfonate impurities remaining in the filtrate. The existence of the ammonium alkene sulfonic acid salt at this point provides an intermediate sulfonic acid salt material readily converted to other salts based on a wide variety of other cations by a simple exchange reaction with a base containing the other cation thereby liberating ammonia readily recycled to the conversion reaction or used otherwise.

Other suitable salts include sodium chloride, sodium bromide, sodium fluoride, sodium bifluoride, potassium chloride, potassium bromide, potassium fluoride, potassium bifluoride, lithium chloride, calcium chloride, calcium bromide, calcium fluoride, magnesium chloride, magnesium bromide, magnesium fluoride and barium chloride.

Where desired, the salt reactant used in the present process is suitably a salt of a metal of groups III–VIII of the Periodic Table (Fisher 1955). Thus alkene sulfonic acid salts having other cations such as Ti, V, Cr, Mn, Fe, Co, Ni, Cu, Zn, Al and the like may be produced via either an exchange type of reaction or a direct reaction of appropriate salts. Where the direct conversion reaction is used to supply these metals, preferred non-basic salts are the halides such as $TiCl_4$ and other halides of titanium as well as halides of the other metals. Where the exchange reaction is used based on an ammonium alkene sulfonic acid salt intermediate, bases containing the other cations are fed as such or generated in situ from oxides, carbonates and the like.

When one uses a cation exchange operation based on an ammonium alkene sulfonic acid salt intermediate wherein another cation is subsequently substituted for the ammonium cation, the process also produces co-product ammonia.

The ammonia is readily recycled if desired by reaction with co-product volatile acid to regenerate non-basic salt for the process.

In some instances an ammonia recycle type of conversion is suitably operated as a virtually self-contained catalytic operation based on halogen, with little or no net exit of halogen from the conversion reaction stage, feeding only input sultone, alkene sulfonic acid or mixture thereof, plus diluent and make-up ammonium halide while recycling ammonia from a subsequent exchange reaction stage which latter stage also receives a feed of base for the cation exchange operation.

The proportions of the non-basic salt used relative to the sultone or alkene sulfonic acid or mixture is preferably about stoichiometric; i.e., one mol of salt whose cation has a valence of 1 per $SO_3$ group of the sultone, acid or mixture. Where the salt cation has a higher valence; i.e., 2, 3, 4, etc. then proportionately less mols of salt is required. Since the reaction of the present process is for the most part a solid-liquid reaction, fundamentally it is desirable to have present an excess of the non-basic salt. This consideration is disadvantageous in some instances because of the problem of difficult removal of the excess salt from the alkene sulfonic acid salt product. Thus with a feed of metal salts to the reaction system, one normally prefers to use at most a small excess of salt, typically up to about 10 percent excess. When using the ammonium salts, the excess salt is readily removed by the solvent system as taught herein and can be recycled so this consideration does not limit the amount of excess salt permitting higher ratios of up to 50 percent or more excess salt with the ammonium salt. Higher ratios generally are less preferred because of the need for recycling large quantities of salt.

On the other hand, some detergent of soap formulations contain salt as a deliberately desired and used component. Where the product alkene sulfonic acid salt is to be used in such an application, it may not be necessary to go to great lengths to avoid the co-presence of residual non-basic salt only to have salt added subsequently at the time of formulation. In such instances, one may prefer to use in the present conversion reaction the non-basic salt which is desired in the ultimate formulation, adjusting the amount of the excess fed for the reaction to correspond to all or part of the amount of salt desired in the ultimate formulation.

Suitable solvents are inert organic solvents, preferably hydrocarbon solvents because sultones are soluble in such solvents and because the ammonium alkene sulfonic acids are soluble therein. Preferred hydrocarbon solvents are paraffins or olefins having from about 5 to about 20 carbon atoms per molecule, such as pentane, hexene, decane, decene, dodecene, tetradecene, hexa-decene and the like. In many instances, it is preferred to use a solvent which is readily separated from the olefins sulfonated so that unsulfonated olefins may be removed from the product alkene sulfonic acid salts with the solvent and subsequently recovered from the solvent.

The conditions of the product recovery operations are readily established by those skilled in the art based mainly on the physical properties of the solvent chosen and on the solubility of the alkene sulfonic acid salt product.

As a general proposition, sulfonic acid salts produced by the present process have valuable surface active properties and are useful with other materials in built and un-built formulations known to those skilled in the art. For example, U.S. Pat. Nos. 3,332,874–3,332,880 describe combinations of sulfonic acid salts with alkyl glyceryl ether sulfonates, with alkyl aryl sulfonates and alkyl ether sulfates, with esters of condensates of coconut fatty alcohols and 3(N,N-dimethyl-N-alkylammonio)-2-hydroxypropane-1-sulfonate, with amides, and with amides and alkyl glyceryl ether sulfonates. The present products are useful in such ways in various forms, such as liquid, flake, granule, tablet and bar form. When used with builders and other adjuvants, conventional materials and proportions may be used as set forth for example in U.S. Pat. No. 3,332,880, Columns 10 and 11, herein incorporated by reference.

The following examples set forth the best mode contemplated by the inventor of carrying out the invention.

EXAMPLE I

To 20 ml tetradecane in a flask was added 3 grams (10.84 millimols) of 3-hydroxytetradecane-1-sulfonic acid sultone and 6 grams (112.14 millimols) of ammonium chloride. The sultone dissolved but the salt did not so that a slurry was formed. The flask containing the slurry was heated slowly in a bath while passing a stream of dry nitrogen through the reaction mixture to strip out liberated HCl. The vent gas was stripped of HCl by bubbling through water and the resulting aqueous solution containing liberated HCl was titrated with 1-normal NaOH to follow the rate of reaction.

Hydrogen chloride evolution started at a bath temperature of about 100°C and reached a maximum evolution rate at a bath temperature between 160° and 180°C. When hydrogen chloride evolution was finished, the reaction mixture was allowed to cool to room temperature and extracted with ether to remove the tetradecane solvent and unreacted sultone.

The resulting dry residue (after evaporation of ether) was extracted with hot carbon tetrachloride and the clear solution of the ammonium sulfonic acid salt was separated from the excess ammonium chloride. Ammonium chloride recovered was 5.45 grams; thus 0.55 grams reacted which was 94.8 percent of the theoretical amount for the sultone fed.

The carbon tetrachloride was then removed by vaporization leaving 3.05 grams of a white to yellowish solid corresponding to 95.9 percent of the theoretical value. This solid was analyzed by thin layer chromatography and found to contain 100 percent alkene sulfonic acid. The thin layer chromatography procedure is described in J.A.O.C.S. Vol. 48, December 1971, page 790–793.

EXAMPLE II

1 Gram (3.28 mmole) of 3-hydroxy-hexadecane-1-sulfonic acid sultone and 1 gram of ammonium chloride were combined in a flask provided with a heating bath, an agitator and a nitrogen sparging system. The mixture was heated slowly to 170°C while stirring and passing dry nitrogen over the reactants.

At 74°C bath temperature, slightly above the melting point of the sultone, molten sultone and inorganic salt formed an easily stirrable slurry.

Evolution of hydrogen chloride started slightly above 100°C and was finished at 168°C, at that point the slurry had turned into a foamy white solid. The reaction product was dissolved in a cold mixture of water and 2-butanone (30 ml each). The pH was adjusted to neutral and then the mixture extracted with hexane to remove unreacted sultone. Solid NaOH was added to the neutral-free solution and the mixture refluxed liberating ammonia. The refulxing was continued until the smell of ammonia disappeared and the ammonium sulfonate had been converted into sodium sulfonate.

Evaporation to dryness produced 1.98 grams of a mixture of sodium sulfonate and inorganic salt. The excess salt was removed by dissolving the sulfonate-salt mixture in 25 ml of a 50 percent 2-propanol 50 percent water solution. 4 Grams of $Na_2CO_3$ was added to the clear warm (55°C) solution; this effected a separation into an aqueous layer containing the inorganic salt and practically no sulfonate and into an alcohol phase containing no salt and all the sulfonate.

The aqueous layer was removed and the desired sodium salt or hexadecene-1-sulfonic acid was recovered by evaporating the propanol phase to dryness.

Recovery: 0.90 (2.75 mmole) = 83.8 mole percent
Purity: 100 percent alkene sulfonate by thin layer chromatography

EXAMPLE III

A mixture of 1 gram (3.28 mmoles) of 3-hydroxy-hexadecane-1-sulfonic acid sultone with 1 gram of $NH_4F \cdot HF$ was slowly heated with stirring to 200°C while a stream of dry nitrogen was passed over the reactants. Above 72°C, sultone and fluoride formed a viscous near transparent melt; at 117°C the mixture turned yellowish and the viscosity increased; at 129°C gas bubbles showed up in the melt; finally, at 166°C, the reaction mixture turned from highly viscous into solid.

After cooling, the reactant product was dissolved in a mixture of water and 2-butanone and recovered from unreacted sultone and ether neutrals by extraction with hexane. From the hexane solution 0.33 grams of a dark brown product was recovered.

Evaporation of the aqueous, neutral-free solution gave 1.28 grams of crude ammonium sulfonate mixed with inorganic salt. After desalting and removal of the solvents, 0.52 g (1.61 mmoles) = 49.1 mole percent of the desired alkene product was recovered.

The purity was found to be 100 percent by thin layer chromatography.

EXAMPLE IV

Hexadecene-1 of 99 mole percent purity was sulfonated with gaseous $SO_3$ (3 percent in $N_2$) using a conventional falling film reactor. Reaction temperature was 50°C, the ratio of $SO_3$ to olefin was 1:1.

The product acid mix was a reddish brown liquid that solidified on standing to give a medium brown solid; the saponification number was found to be 19.3 mg KOH/g.

To prepare the alkene sulfonate, 30 grams of the crude acid mix was dissolved in 75 ml decalin, 30 grams $NH_4Cl$ was added and the mixture heated slowly to 160°C. During this period the mixture was mechanically stirred and a stream of dry nitrogen was passed over the reactants.

Evolution of hydrogen chloride began at 40°C, the volume increasing as the temperature rose. At 160°C, the gas evolution ceased producing a clear brownish phase over a white salt slurry. The brownish phase solution of (ammonium sulfonate salt) was separated from the $NH_4Cl$ by filtration through a coarse frit while the system was still hot. (From the consumption of $NH_4Cl$, a 80.4 percent conversion of the crude sulfonate was calculated.) On standing, a precipitate settled from the filtrate. The precipitate was recovered by centrifuging. After washing with hot decalin and subsequently with hexane, 23.6 grams of a snow white solid ammonium sulfonate salt was obtained.

To prepare a sodium sulfonate salt, the ammonium sulfonate salt was refluxed with a solution of 4 grams NaOH in 100 ml water containing 20 ml 2-butanone, the latter being used to suppress the heavy foaming. Evolution of ammonia was noted. After 3 hours, the smell of ammonia had disappeared. The pH of the solution was then adjusted to 8, and the mixture was extracted with hexane to remove neutrals.

From the neutral-free solution resulting, 28.2 grams of a mixture of sulfonate and sulfate was recovered. This product was desalted by dissolving it in 400 ml of a 50 percent 2-propane-50 percent water solution, effecting phase separation by adding 50 grams $Na_2CO_3$. The aqueous salt-containing phase was removed and the desired alkene sulfonate recovered from the alcohol layer.

Recovery: 14.0 g snow white solid (46.4 percent of theory)
Purity: 100 percent alkene sulfonate by thin layer chromatography

I claim:

1. A process for producing an alkene sulfonic acid salt which comprises reacting a sultone having from about 6 to about 36 carbon atoms per molecule in an anhydrous system with a non-basic alkali metal, alkaline earth metal or ammonium halide salt at a temperature from about 50° to about 250°C producing a volatile hydrogen halide and alkene sulfonic acid salt, while removing said volatile hydrogen halide to enhance conversion of the sultone to the alkene sulfonic acid salt.

2. The process of claim 1 wherein said non-basic salt is a chloride, fluoride or a bifluoride.

3. The process of claim 1 wherein said non-basic salt is ammonium chloride, ammonium fluoride, ammonium bifluoride, an alkali metal chloride, an alkali metal fluoride, an alkali metal bifluoride, an alkaline earth metal chloride or an alkaline earth metal fluoride.

4. The process of claim 1 wherein the non-basic salt is sodium chloride, sodium fluoride, sodium bifluoride, sodium bromide, potassium chloride, magnesium chloride, or calcium chloride employed in an approximately stoichiometric amount relative to the sultone used in the reaction.

5. The process of claim 1 wherein said non-basic salt is ammonium chloride.

6. The process of claim 1 wherein said non-basic salt is sodium chloride.

7. The process of claim 1 conducted in an inert organic solvent.

8. The process of claim 1 conducted in a hydrocarbon solvent.

9. The process of claim 1 wherein the non-basic salt is ammonium chloride, ammonium fluoride or ammonium bifluoride and the reaction is conducted in an inert hydrocarbon solvent for the alkene sulfonic acid formed.

10. The process of claim 1 wherein the temperature is from about 120° to about 200°C.

11. The process of claim 1 wherein the sultone has from about 12 to about 18 carbon atoms.

12. The process of claim 1 wherein the sultone has from about 12 to about 18 carbon atoms, the temperature is from about 120° to about 200°C.

13. The process of claim 1 wherein the removal of said volatile hydrogen halide is facilitated by passing inert gas through the reaction system.

14. A process for producing alkene sulfonic acid salts which comprises reacting a sultone having from about 10 to about 20 carbon atoms with a non-basic alkali metal, alkaline earth metal or halide salt to produce hydrogen ammonium halide and alkene sulfonic acid salt, the reaction being conducted in an anhydrous system under conditions producing said hydrogen halide and said sulfonic acid salt, while removing said hydrogen halide to enhance conversion of the sultone to alkene sulfonic acid salt.

15. The process of claim 14 wherein liberated hydrogen halide is stripped out of the reaction mixture.

16. A process for producing an alkene sulfonic acid salt which comprises reacting ammonium chloride or ammonium bromide with a sultone having from about 6 to about 36 carbon atoms per molecule, said reaction being conducted in an anhydrous system and in the presence of a hydrocarbon solvent for the alkene sulfonic acid salt, at a temperature of from about 50° to about 250°C, the ammonium chloride or ammonium bromide being present in an excess above the stoichiometric requirement, removing HCl or HBr formed as a by-product in the reaction, separating from the solution of solvent and alkene sulfonic acid salt the excess ammonium chloride or ammonium bromide remaining after the reaction, and separating the solvent from product alkene sulfonic acid salt.

17. A process according to claim 16 wherein ammonium chloride is employed in the reaction with sultone.

18. A process for producing an alkene sulfonic acid salt, HF and ammonia which comprises reacting ammonium fluoride or ammonium bifluoride with a sultone having from about 6 to about 36 carbon atoms per molecule, said reaction being conducted in an anhydrous system and in the presence of a hydrocarbon solvent for the alkene sulfonic acid salt, at a temperature of from about 50° to about 250°C, the ammonium fluoride or ammonium bifluoride being present in an excess above the stoichiometric requirement, recovering HF formed as a by-product in the reaction, separating from the solution of solvent and alkene sulfonic acid salt the excess ammonium fluoride or ammonium bifluoride remaining after the reaction, and separating the solvent from product alkene sulfonic acid salt.

* * * * *

UNITED STATES PATENT OFFICE
CERTIFICATE OF CORRECTION

PATENT NO. : 3,888,918
DATED : June 10, 1975
INVENTOR(S) : Gerhard O. Kuehnhanss It is certified that error appears in the above—identified patent and that said Letters Patent are hereby corrected as shown below:

Column 7, line 51, reads "extend", should read -- extent --. Column 13, line 27, reads "or halide", should read -- or ammonium halide --; line 28, reads "drogen ammonium halide", should read -- drogen halide --.

Signed and Sealed this twenty-fifth Day of November 1975

[SEAL]

Attest:

RUTH C. MASON
Attesting Officer

C. MARSHALL DANN
Commissioner of Patents and Trademarks